Dec. 28, 1971 F. R. QUINN 3,630,971

SENSOR AND METHOD OF MAKING SAME

Filed Dec. 5, 1969

INVENTOR
FREDERIC R. QUINN
BY Robertson, Bryan, Parmelee & Johnson.
ATTORNEYS

1

3,630,971

SENSOR AND METHOD OF MAKING SAME

Frederic R. Quinn, Red Hook, N.Y., assignor to Zyrotron Industries, Inc., South Hackensack, N.J.

Filed Dec. 5, 1969, Ser. No. 882,549
Int. Cl. H01b *1/06;* H01c *7/04*
U.S. Cl. 252—518 27 Claims

ABSTRACT OF THE DISCLOSURE

Metal sulfide compounds and metal phosphate compounds are combined in a selected manner to form a resistance material for a stable sensor having a variable resistance characteristic in response to changes in temperature and voltage. The resistance material exhibits a large resistance variation as temperature of a medium being sensed passes through a critical value. The critical value is selected by choosing the types of compounds in the sensor. Resistance material is prepared in a preselected manner to obtain reliable performance characteristics throughout adverse environmental conditions. An oxide of a metal also present in the electrical leads connected to the sensor is dispersed throughout the sensor to provide strong lead attachments.

This invention relates to a new and useful composition of resistance materials. More specifically this invention relates to a sensor for sensing temperature or voltage and a method of making such sensor utilizing the composition of this invention.

The sensor of this invention contemplates a material composition which possesses a predictable resistance characteristic when exposed to varying temperatures or voltages. The material composition is characterized by the presence of metal sulfides and modifiers such as metal phosphates.

Specifically, a resistance composition made in accordance with the present invention comprises (1) at least one member of a group of metal sulfides, and (2) at least one member of the group consisting of the phosphates of sodium, calcium, magnesium, zinc, lead and copper. Another resistance composition of this invention differs from the above described composition in that a lead bonding compound is included such as the oxide of a metal which is also present in the electrical leads employed with a sensor.

It is known that metal sulfides when combined in a composition as described in a U.S. patent to F. R. Quinn 2,609,470, form a sensor whose resistance varies when exposed to varying temperatures. In the vincinity of a critical temperature, $T_c$, a rapid change in sensor resistance is encountered for a relatively small temperature change.

The resistance material compositions made in accordance with the invention provide excellent control of sensor resistance variations below the critical temperature as well as significant reduction of thermal hysteresis effects. The sensor of this invention may be subjected to a low temperature environment without impairment of its sensing capabilities. High electrical currents may be passed through the sensor without degeneration of its sensing characteristics. Reasonable time constants are obtained to provide a rapidly responding temperature or voltage overload sensor. The sensor of this invention further exhibits a significantly low sensitivity to moisture, being essentially non-hygroscopic.

2

It is, therefore, an object of this invention to provide a resistance composition made of a versatile controllable variable resistance material for sensing temperature or voltage.

It is a further object of this invention to provide a method of making a versatile temperature and voltage detecting sensor.

Figure 1:
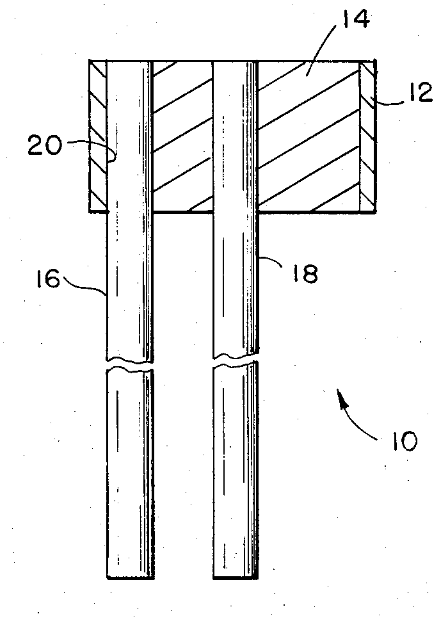
Figure 2:
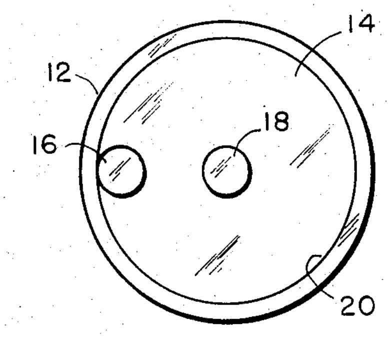

These advantages and objects may be further understood from the following description of resistance compositions and methods of making the sensor in conjunction with the drawing wherein FIG. 1 is an enlarged substantially to scale section view of a thermal sensor in accordance with the invention; and FIG. 2 is an enlarged substantially to scale end view of the thermal sensor of FIG. 1.

In FIG. 1 a thermal sensor 10 in accordance with the invention is shown. Sensor 10 is formed with a thin metal shell 12 in the form of a ring. The shell encloses a variable resistance material 14 prepared and formed in accordance with the invention. Electrical contact leads 16–18 are embedded in material 14 with lead 16 also in electrical contact with the inner surface 20 of shell 12. Lead 18 is spaced from lead 16 and generally concentric with the ring shell 12.

In a typical thermal sensor with a critical break temperature of 175° C. and as depicted in the figures, shell 12 has an outside diameter of about .202" and an axial length of about .078". The electrical leads have a diameter of about .028" and are spaced about .080". A resistance of the sensor as measured across leads 16–18 is from about 75,000 ohms to about 150,000 ohms at cold temperatures and generally less than 100 ohms above 175° C.

The temperature-resistance (T–R) characteristic curve for a sensor made in accordance with the invention exhibits a markedly rapid change in resistance, R, over a narrow temperature range in the vicinity of a critical break temperature, $T_c$. Typically a change of several degrees in temperature will cause a change in resistance by three or more orders of magnitude. The T–R curve generally exhibts a high sensor resistance at low temperatures near for instance zero degrees centigrade. As the sensor is exposed to higher temperatures of a medium the sensor resistance first decreases in a gradual manner with a relatively constant negative temperature coefficient. The phosphate modifiers in the sensor composition provide a convenient tool for controlling the shape of this portion of the curve. As the temperature continues to increase and approaches the critical value, $T_c$, a rapid increase in the negative temperature coefficient results and the resistance drops off sharply. The location of the critical break temperature is primarily determined by the metal sulfides used in the composition.

Over a temperature range of several degrees at the critical temperature, $T_c$, the sensor resistance drops by a factor of from about 10 to about $10^5$ or more to a very low resistance value of, for instance, several ohms. The sensor maintains this low resistance value as the temperature continues to increase.

When the temperature approaches the critical temperature, $T_c$, from some high value, the sensor exhibits a high sudden increase in resistance at about the same critical temperature, $T_c$, with little thermal hysteresis. The various metal sulfides employed in the sensor determine the value of the critical temperature. The presence of the phosphate modifiers preserves this and other aspects of the sulfides and aids in reducing the thermal hysteresis. As a result, the sensor of this invention exhibits a reliable and repeatably T–R characteristic over an extended temperature range.

The consistency of the behavior of the sensor of this invention advantageously lends itself with other electronic circuitry to control, for instance, a refrigerator unit or provide overload protection for an electrical device.

The sensor of this invention includes as constituents a combination of several metal sulfide compounds. These sulfide compounds are chosen for the desired sensor critical temperature and negative temperature coefficient. Several metal sulfide compounds may be employed in a sensor and selected from a group such as sodium sulfide, potassium sulfide, rubidium sulfide, cesium sulfide, copper sulfide, silver sulfide, gold sulfide, magnesium sulfide, calcium sulfide, strontium sulfide, barium sulfide, zinc sulfide, cadmium sulfide, chromium sulfide, antimony sulfide, titanium sulfide, molybdenum sulfide, zirconium sulfide and platinum sulfide.

In addition to the metal sulfide compounds, chemical constituents are employed to provide a medium in which the selected metal sulfides can react together without excessive dissociation as well as to provide solid bulk which is shaped in the desired sensor form. These constituents further influence the desired electrical properties. The chemical constituents include several phosphates selected from a group such as magnesium orthophosphate, calcium orthophosphate, zinc orthophosphate, sodium orthophosphate, lead orthophosphate and copper orthophosphate. Mono and higher basic forms of some of the selected orthophosphates may be included.

Electrical lead contact with the sensor is enhanced by dispersing throughout the sensor a material which has a chemical bonding affinity for the leads. This chemical lead bonding material is chosen for its ability to aid electrical contact of the leads with the sensor throughout diverse environmental conditions. As a result lead separation problems are avoided and a rugged sensor is obtained. In a sensor described herein Nichrome electrical leads (80% Ni, 20% Cr) are employed and excellent lead contact with the sensor is obtained by dispersing a lead bonding material such as chromium oxide ($Cr_2O_3$) throughout the sensor. Chemical bonding of this lead bonding material to the electrical leads occurs during a sintering step in the manufacture of the sensor.

In the preparation of a sensor of this invention all chemicals are used in the anhydrous powder form. The metal sulfides and phosphates are obtained in fine comminuted form with particle sizes preferably finer than 300 mesh.

In order to assure the anhydrous state of the phosphates they are calcined to drive off moisture. Calcination of the phosphates is accomplished by placing phosphate material in a stainless steel boat of cylindrical shape. Super dry heated nitrogen gas is passed through an end opening of the cylindrical boat to pass in contact with the phosphate material. The dry nitrogen gas is initially heated to a temperature of about 800 F. and then brought to a temperature of about 1800 F. which is maintained for about an hour. Thereafter the phosphate material is allowed to cool to about 600 F. under the nitrogen atmosphere. After cooling, the phosphate is removed from the boat and stored in a hermetically sealed container.

The resistance composition of this invention is produced from the following ingredients in, for example, the following ranges of approximate parts by weight:

| | Approximate parts by weight |
|---|---|
| Cadmium sulfide | 30–60 (preferably 40–50). |
| One or more other metal sulfides | 20–85. |
| At least one or more of the phosphates of sodium, calcium, magnesium, zinc, copper and lead | 100–300. |
| Optional | |
| An oxide of a metal employed in electrical leads attached to a sensor formed of the resistance composition of this invention | Up to 15. |

The phosphates have been found useful when present from about 30% to about 65% by weight of the powder mix. A preferred composition utilizes phosphates of about 55% by weight.

Illustrative examples of the phosphates of the aforementioned metals that are useful in making the resistance material of this invention are sodium orthophosphate, $NaHPO_4$ (mono-H); calcium orthophosphate $CA_3PO_4$ (tri-); magnesium orthophosphate $Mg_3(PO_4)_2$ and $MgHPO_4$ (mono-H); zinc orthophosphate, $Zn_3(PO_4)_2$; copper orthophosphate $Cu_3(PO_4)_2$; and lead orthophosphate $Pb_3(PO_4)_2$.

The particle size of the ingredients mentioned before generally is of very fine mesh, 300 mesh being preferred and are either initially anhydrous or rendered so prior to admixing of the ingredients.

The finely divided or comminuted ingredients are thoroughly mixed in a blender and the resultant loose mixture heated in a neutral atmosphere such as nitrogen at a temperature and for a time period sufficient to form a sintered mass. The maximum temperature for this heating is controlled generally to within the range of from about 1400° F. to about 1600° F. for a time period depending upon the sintering temperature of the particular ingredients employed, their particle size and other influencing factors. Typically an hour at the sintering temperature may be sufficient while an additional time period is consumed to raise the temperature from 800° F. to the maximum temperature.

At the end of the described sintering, the admixture has a sintered cake-like form. This cake-like product is then pulverized to a comminuted powdered form of preferably finer than 300 mesh particle size.

Following this pulverizing the admixture is placed in a suitable mold such as a steel die together with electrical leads of selected composition. The electrical leads and admixture are then compressed at very high pressures generally of the order of 5,000 pounds per square inch or more into the desired final shape of the sensor.

The compressed mass is then again sintered in an oxygen-free environment such as nitrogen. This last sintering step involves heating of the compressed specimen to a temperature in the range of from about 1200° F. to about 1500° F. for a time period sufficient to sinter the specimen. Time periods of about one hour as described in the following examples have been found useful.

Following this last heat treatment the sensor was subjected to an electrical stabilizing treatment.

EXAMPLE 1

A sensor having a critical temperature of about 177.8° C. was formed by collecting several anhydrous fine powder sulfides, phosphates and chromium oxide in a batch. Specifically 30 grams of silver sulfide, 10 grams of molybdenum sulfide, 44 grams of cadmium sulfide, 122 grams of several phosphates and 7 grams of chromium oxide were placed in a blender. The 122 grams of anhydrous phosphate material were formed of 30 grams of sodium orthophosphate (mono basic), 22 grams of calcium orthophosphate, 35 grams of magnesium orthophosphate and 35 grams of magnesium orthophosphate (mono basic). The materials in the blender were then thoroughly mixed.

After blending the loose mixture was placed in a stainless steel boat and heated in a nitrogen atmosphere to a temperature of about 1460° F. and for about an hour. During this heating step further calcination for moisture removal occurs and the mixture is slightly caked and sintered.

The sintered mass was then again placed in a blender and broken up into particle sizes preferably smaller than about 300 mesh to form a powder mix as the basis for the sensor.

The powder mix was then placed in a stainless steel shell of thin sheet stock. This shell serves as an outside surface of the sensor. The shell and powder mix were then placed in a die for powder compression. Nickel-chromium electrical wire leads (.028 inch diameter) were embedded in the powder mix with approximately .090 inch spacing to a depth from about .1 to about .125 inch. The entire die was then pressurized in a hydraulic press to compress the powder with the lead wires into the desired compact shape.

The compressed mix was thereupon heated in a nitrogen atmosphere to a temperature of 1260° F. for one hour to sinter the compressed mix.

After sintering of the compressed six the sensor was subjected to an electrical treatment to stabilize the sensor. This treatment involved passing an AC current of about 20 milliamperes at 20 volts for about 15 minutes to complete the sensor. The break or critical temperature measured for this sensor was 177.8° C.

EXAMPLE 2

In another sensor prepared with the same composition constituents as in the first example but with the calcium phosphate replaced with zinc phosphate. An excellent sensor was obtained. This sensor was prepared by mixing anhydrous components as follows: 30 grams of sodium orthophosphate (mono basic), 28 grams of silver sulfide, 28 grams of zinc or the phosphate, 15 grams of molybdenum sulfide, 30 grams of magnesium orthophosphate (mono basic), 30 grams of magnesium orthophosphate, 8 grams of chromium oxide, and 24 grams of cadmium sulfide. This mixture was blended and prepared as described in Example 1. The completed sensor exhibited a critical break temperature of 177.8° C.

EXAMPLE 3

A composition utilizing the same constituents in the same amount of Example 1 was formed but with both magnesium orthophosphates in reduced amounts of 17.5 grams each and the cadmium sulfide reduced to 24 grams. The mixture was prepared as described in Example 1. The completed sensor exhibited a critical break temperature of 177.8° C.

EXAMPLE 4

A composition having the composition of Example 1 with 30 grams of silver sulfide substituted by 30 grams of barium sulfide was prepared in the same manner as described in Example 1. The completed sensor exhibited a critical temperature break point of 750° C.

EXAMPLE 5

A composition similar to the composition of Example 1 with 30 grams of silver sulfide substituted by 30 grams of platinum sulfide was prepared in the same manner as described in Example 1. The completed sensor exhibited a critical break temperature of 25° C.

EXAMPLE 6

A composition similar to that of Example 1 with 30 grams of silver sulfide substituted by 30 grams of copper sulfide was prepared in the same manner as in Example 1. The completed sensor exhibited a critical break temperature of 125° C.

EXAMPLE 7

A composition similar to that of Example 1 with 30 grams of silver sulfide substituted by 30 grams of antimony sulfide was prepared in the manner of Example 1. The completed sensor exhibited a critical break temperature of 500° C.

EXAMPLE 8

A composition similar to that of Example 1 with the 30 grams of silver sulfide deleted was prepared in the same manner as in Example 1. The completed sensor exhibited a critical break temperature of 500° C.

Individual constituents of the composition as described in the first example may be varied. Such variation is listed below in weight percentages for individual anhydrous constituents while the other constituents are present generally in the amounts as indicated in the first example.

Cadmium sulfide from about 9% to about 65% by weight
Molybdenum sulfide from about 4% to about 10% by weight
Silver sulfide from about 6% to about 40% by weight
Sodium orthophosphate (mono or di basic) from about 6% to about 36% by weight
Calcium orthophosphate from about 6% to about 40% by weight
Magnesium orthophosphate (mono basic) from about 5% to about 40% by weight
Magnesium orthophosphate from about 5% to about 40% by weight It is preferred that the compositions are prepared with the cadmium sulfide in a weight balance with silver sulfide or any of the latter's substitutes. Such weight balance is preferably from about 1:1 to about 2:1 of cadmium sulfide to the other metal sulfide.

Other phosphates may be used besides those mentioned in the examples. Copper and lead phosphates have been found useful. The substitution of different metal sulfides has been found to be particularly desirable to produce sensors having different properties such as different critical break temperatures.

Having thus described various examples of resistance material compositions made in accordance with the invention their ability to withstand corrosive environments greatly extend their industrial utility. The moldability of the resistance composition allows a multitude of shapes such as strips, beads, discs and the like, yet with strong lead attachment. Versatility and reliability of a sensor made in accordance with the invention are enhanced. Repeated cycling of environmental conditions such as temperature can be tolerated without weakening of lead attachments.

What is claimed is:

1. A method of forming a resistance composition comprising the steps of:

admixing in comminuted substantially anhydrous form selected portions of materials with at least one material being a metal sulfide and a second material being a phosphate of a metal;

compressing said admixture into a desired shape; and heating said compressed admixture to a temperature and for a time period selected to sinter said compressed admixture into said resistance composition.

2. The method of forming the resistance composition as claimed in claim 1 wherein said admixing step is followed by:

heating the loose comminuted admixed materials to a temperature and for a time period selected to presinter the admixture; and pulverizing the presintered admixture into a comminuted form.

3. The method of forming the resistance composition as claimed in claim 1 wherein said admixing step further includes:

admixing cadmium sulfide and another metal sulfide with a metal phosphate of from about 30% to about 65% by weight of the admixture.

4. The method of forming the resistance composition as claimed in claim 3 wherein the admixing step consists of:

admixing cadmium sulfide and the metal sulfide in respective weight proportions of in the range of from about 1 to 1 to about 2 to 1.

5. The method of forming the resistance composition as claimed in claim 3 wherein the admixing step further consists of:

admixing at least one phosphate of a metal selected from the group consisting of sodium, calcium, zinc, magnesium, lead and copper.

6. The method of forming the resistance composition as claimed in claim 1 wherein the admixing step further includes:

admixing starting ingredients in relative weight proportions as follows:

(A) from about 9% to about 65% cadmium sulfide;

(B) from about 6% to about 40% of one or more metal sulfide selected from the group consisting of sulfides of sodium, potassium, rubidium, cesium, copper, silver, gold, magnesium, calcium, cerium, barium, zinc, cadmium, strontrium, antimony, titanium, molybdenum, zirconium and platinum;

(C) from about 30% to about 65% of one or more metal phosphates selected from the group consisting of sodium phosphate, calcium phosphate, zinc phosphate, magnesium phosphate, lead phosphate and copper phosphate.

7. A method of forming a sensor comprising the steps of:

preparing a loose blended powder mixture formed of a composition consisting of metal sulfides and phosphate modifiers in the proportion of about 30% to about 65% by weight of phosphate modifiers, said metal sulfides being selected to provide a predetermined critical break temperature and said phosphate modifiers being selected to preserve the sensing characteristics of said metal sulfides throughout environmental variations;

heating said loose blended powder mixture to a temperature and for a time period sufficient to form a sintered mass;

pulverizing said sintered mass into a powder;

compressing the pulverized powder into a desired sensor shape with electrical leads;

heating said compressed sensor to a temperature and for a time period sufficient to sinter said compressed sensor.

8. The sensor forming method as claimed in claim 7 wherein said first sintering step further includes:

heating said loose blended powder mixture to a temperature of between about 1400° to about 1600° Fahrenheit for a time period sufficient to sinter said mass.

9. The sensor forming method as claimed in claim 8 wherein said compressed sensor heating step further includes:

heating said compressed sensor to a temperature of between about 1200° F. to about 1500° F. for a time period sufficient to sinter the compressed sensor.

10. The sensor forming method as claimed in claim 7 wherein said phosphate modifiers are preconditioned by a moisture removal step consisting of:

heating said phosphate modifiers in a super dry inert atmosphere to an elevated temperature and for a time period sufficient to render said phosphate modifiers substantially anhydrous.

11. The sensor forming method as claimed in claim 10 wherein said phosphate modifier moisture removal step consists of heating said phosphate modifiers in an atmoshpere of super dry nitrogen to a temperature of about 1800° F. for a time period of about an hour.

12. A method of forming a sensor formed of a poly sulfide composition with electrical leads of selected composition comprising the steps of:

forming a blended anhydrous mixture of poly sulfide resistance compounds having a selected temperature response characteristics with phosphate modifiers and an electrical lead bonding compound selected to form a chemical bond with the electrical leads;

compressing the mixture with the electrical leads into a desired sensor shape;

heating said compressed mixture to a temperature selected to sinter the compressed mixture and form a chemical bond between the electrical leads and the electrical lead bonding compound.

13. The method of forming a sensor as claimed in claim 12 wherein the electrical lead bonding compound consists of an oxide of a metal employed in the electrical leads.

14. The method of forming a sensor as claimed in claim 13 wherein the lead bonding metal oxide compound comprises up to about 5% by weight of the blended mixture.

15. The method of forming a sensor as claimed in claim 14 wherein the electrical leads employed in the sensor are formed of a nickel chromium alloy and said lead bonding compound is formed of chromium oxide.

16. A resistance material composition including in compressed sintered form:

two or more metal sulfides and one or more metal phosphates.

17. The resistance material composition as claimed in claim 16 wherein the metal phosphate is present in the amount of about 30% to about 65% by weight.

18. The resistance material composition as claimed in claim 16 wherein the metal phosphate is selected from the group consisting of phosphates of sodium, calcium, zinc, magnesium, lead and copper.

19. The resistance material composition as claimed in claim 16 wherein the metal sulfides are selected from the group consisting of sulfides of cadmium, molybdenum, silver, barium, platinum, copper and antimony and wherein the metal phosphates are selected from the group consisting of phosphates of sodium, calcium, zinc, and magnesium.

20. A sensor exhibiting a variable resistance characteristic across a pair of electrical leads of preselected metallic composition including in compressed sintered form:

two or more metal sulfides;

one or more metal phosphates and an oxide of a metal present in the electrical leads.

21. The sensor as claimed in claim 20 wherein the oxide of the metal is present up to about 5% by weight of the starting ingredients of the sensor.

22. The sensor as claimed in claim 21 wherein the oxide is chromium oxide.

23. The sensor as claimed in claim 21 wherein the metal phosphate is present between about 30% to about 65% by weight of the starting sensor ingredients.

24. The sensor as claimed in claim 23 wherein the metal sulfides consist of cadmium sulfide and one or more metal sulfides selected from the group consisting of sulfides of molybdenum, silver, barium, platinum, copper and antimony.

25. The sensor as claimed in claim 24 wherein the cadmium sulfide is present in preselected weight balance with the other metal sulfide in the weight ratio range of the starting ingredients of respectively from about 1 to 1, to about 2 to 1.

26. The sensor as claimed in claim 25 wherein one or more metal phosphates are selected from the group consisting of phosphates of sodium, calcium, zinc, and magnesium.

27. The sensor as claimed in claim 26 wherein the selected metal phosphates consist of in relative weight proportions of the starting ingredients:

(A) from about 6 to about 36 parts of sodium phosphate;

(B) from about 10 to about 80 parts of magnesium phosphate;

(C) from about 6 to about 40 parts of calcium phosphate.

References Cited

UNITED STATES PATENTS

| | | | |
|---|---|---|---|
| 1,854,923 | 4/1932 | Browne et al. | 252—521 |
| 2,609,470 | 9/1952 | Quinn | 252—518 |
| 2,740,030 | 3/1956 | Quinn | 252—518 |
| 3,220,881 | 11/1965 | Yando | 252—518 |
| 3,465,278 | 9/1969 | Kern et al. | 252—518 |
| 3,483,139 | 12/1969 | Galasso et al. | 252—518 |
| 3,483,140 | 12/1969 | Graf | 252—518 |

DOUGLAS J. DRUMMOND, Primary Examiner

U.S. Cl. X.R.

252—521; 338—22